United States Patent [19]

Underwood

[11] 4,416,672

[45] Nov. 22, 1983

[54] DEGASSER

[76] Inventor: Gene E. Underwood, 3915 Placid Dr., Casper, Wyo. 82601

[21] Appl. No.: 350,255

[22] Filed: Feb. 19, 1982

Related U.S. Application Data

[63] Continuation of Ser. No. 170,018, Jul. 18, 1980, abandoned.

[51] Int. Cl.³ .............................................. B01D 19/00
[52] U.S. Cl. ...................................... 55/190; 55/203; 55/435
[58] Field of Search ................. 55/176, 177, 189, 190, 55/199-203, 400, 401, 435

[56] References Cited

U.S. PATENT DOCUMENTS

| | | | |
|---|---|---|---|
| 2,216,542 | 10/1940 | Paige | 55/199 X |
| 2,277,651 | 3/1942 | Steele | 55/199 |
| 2,306,265 | 12/1942 | Heald | 55/190 X |
| 2,887,267 | 5/1959 | de Langen | 55/203 X |
| 2,908,652 | 10/1959 | Forrester | 55/190 X |
| 3,169,841 | 2/1965 | Weis | 55/199 X |
| 3,271,929 | 9/1966 | Bowden et al. | 55/177 X |
| 3,831,352 | 8/1974 | Parcels | 55/199 X |
| 3,902,601 | 9/1975 | Townley | 55/435 X |
| 3,973,930 | 8/1976 | Burgess | 55/190 X |
| 3,999,965 | 12/1976 | Burgess | 55/203 X |

FOREIGN PATENT DOCUMENTS 747557 8/1970 Belgium ............................. 55/201

Primary Examiner—Robert H. Spitzer
Attorney, Agent, or Firm—Wofford, Fails & Zobal

[57] ABSTRACT

Apparatus for removing gas from drilling mud comprising a housing defining a chamber having a mud inlet at one end and a processed mud outlet and a gas outlet means at the other end. The mud outlet and the gas outlet means are spaced radially outward from the central axis of the chamber. A shaft is located within the chamber along its central axis with a plurality of angularly spaced blades attached thereto along its length. The outer ends of the blades have flexible members attached thereto. Drive means is provided for rotating the shaft and hence the blades for spinning the mud received through the inlet against the inside surface of the wall of the housing as a thin layer and moving the mud as a thin layer to the other end of the chamber for allowing the gas in the mud to separate. One or more feedback conduits are provided for facilitating control of the thickness of the mud layer on the inside surface of the wall of the housing and for preventing mud from flowing through the gas outlet means.

34 Claims, 11 Drawing Figures

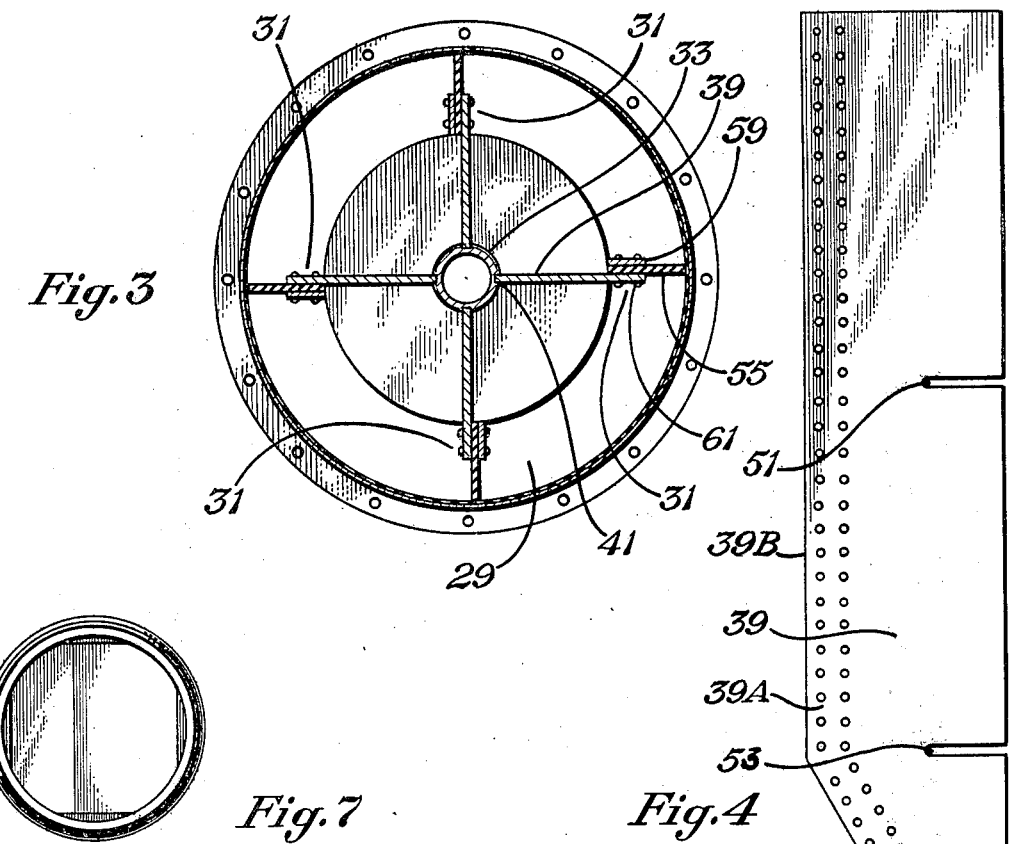
Fig.3
Fig.4
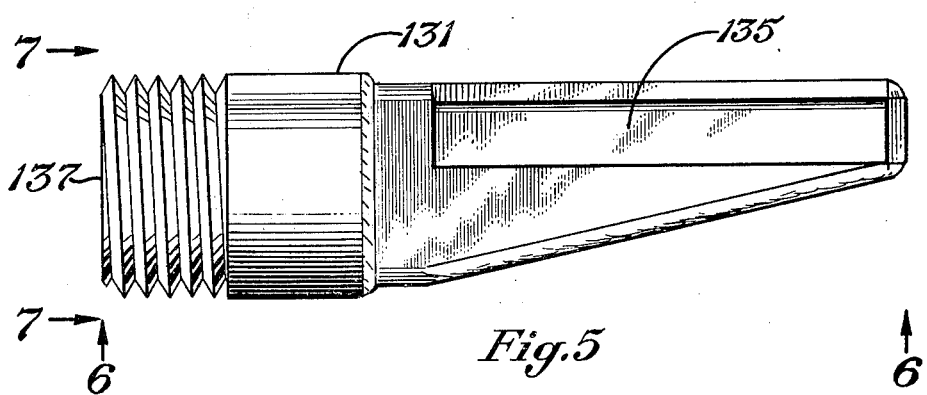
Fig.7
Fig.5
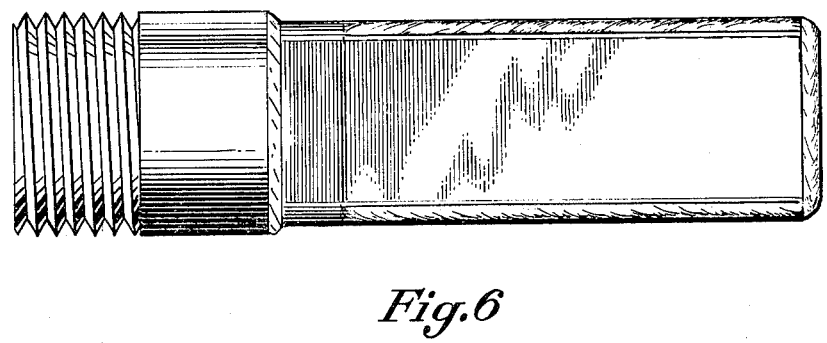
Fig.6

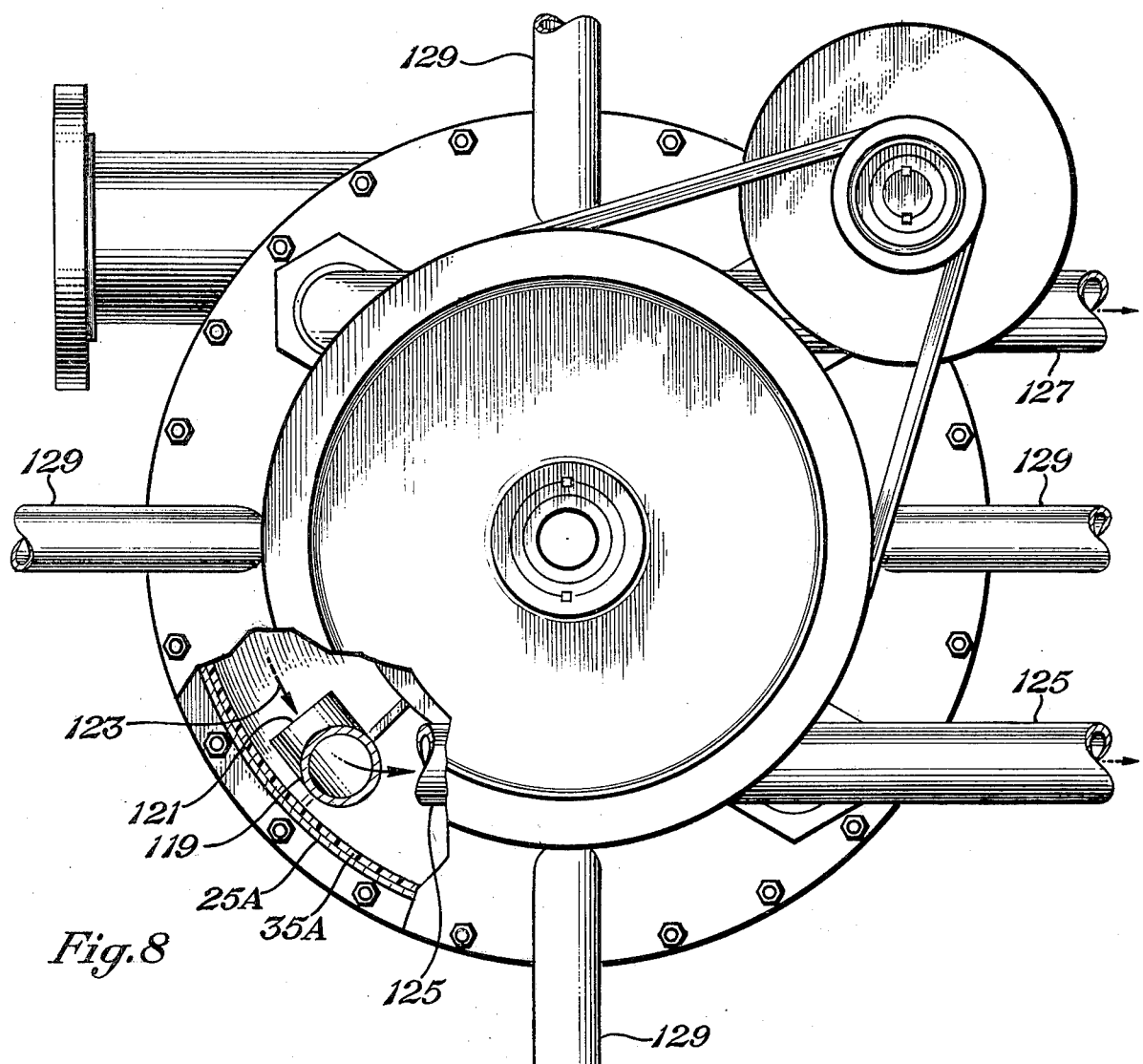
*Fig. 8*
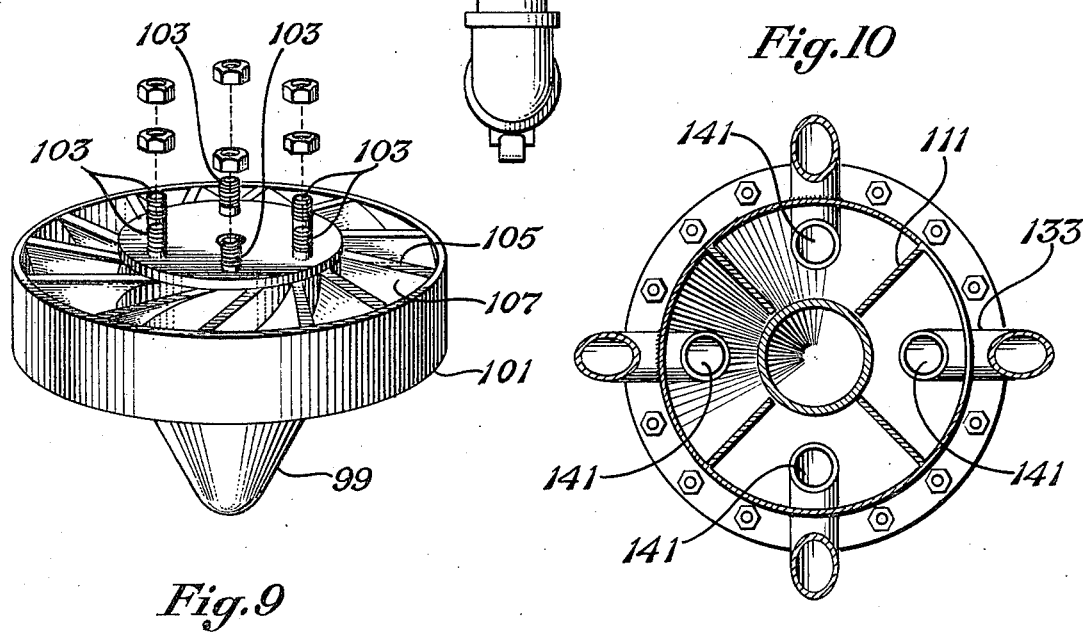
*Fig. 9*  *Fig. 10*

DEGASSER

This application is a continuation, of application Ser. No. 170,018, filed July 18, 1980, abandoned.

FIELD OF THE INVENTION

The present invention relates an apparatus for removing gas such as formation gases or oxygen from drilling fluids in the oil industry.

In drilling operations, it is desirable to process returned drilling fluids to remove contaminating formation gases to re-establish its desired weight or density to render the drilling fluid suitable for recirculation and to prevent danger to the personnel in the drilling area in the event the gases are explosive or poisonous. In addition, it is desirable to remove oxygen from drilling fluid to prevent or minimize corrosion of the drill string and casing.

DESCRIPTION OF THE PRIOR ART

The prior degassers in use today known to me require the fluid to flow through a tortuous path over baffles and employ a vacuum pump to reduce the pressure for degasing purposes. These degassers have these disadvantages in that they are large units which process fluid at a relatively slow flow rate.

SUMMARY OF THE INVENTION

It is an object of the present invention to provide a unique apparatus for separating gas from a fluid that is compact and light weight; is formed of a relatively few components; and will process fluid at a high flow rate.

The apparatus comprises a housing comprising wall structure defining a chamber having a central axis extending between first and second ends of said housing. Inlet means in fluid communication with said chamber, is located at said first end of said housing for receiving fluid to be processed. A plurality of blade means angularly spaced around the axis are located in the chamber for rotation about the axis. Means is provided for rotating said blade means for spinning the fluid received through said inlet means against the inside surface of the wall of said housing as a thin layer and moving said fluid as a thin layer to an end of said chamber opposite said inlet means for allowing the gas in said fluid to separate from said fluid. Gas outlet means is provided at said end of said chamber for withdrawing gas separated from said fluid. In addition, fluid outlet means is provided at said end of said chamber for withdrawing fluid from which the gas has separated.

In a further aspect, said gas outlet means and said fluid outlet means are spaced radially from said axis. In addition, the ends of said blade means are flexible.

In another aspect, conduit means is provided having one end at said end of said chamber and an opposite end in fluid communication with said inlet means for flowing fluid from said end of said chamber to said inlet means for controlling the thickness of the layer of fluid on the inside surface of the wall of said housing and for preventing said fluid from flowing through said gas outlet means.

BRIEF DESCRIPTION OF THE DRAWINGS

FIG. 3 is a cross section of FIG. 1 as seen along the lines 3—3 thereof.

FIG. 4 illustrates a portion of one of the blades of FIG. 2.

FIG. 5 illustrates the inlet end of one of the mud feedback conduits of FIGS. 1 and 2.

FIG. 6 is a view of FIG. 5 as seen along the lines 6—6 thereof.

FIG. 7 is a view of FIG. 5 as seen along the lines 7—7 thereof.

FIG. 8 is a top view of the apparatus of FIGS. 1 and 2 with a part of the structure removed to illustrate an inside component.

FIG. 9 is a perspective view of the blower shown in FIG. 2.

FIG. 10 is a view of FIG. 2 as seen along the lines 10—10 thereof.

FIG. 11 is an enlarged partial cross sectional view of the wall of the apparatus of FIGS. 1 and 2 and its elastomer liner.

DESCRIPTION OF THE PREFERRED EMBODIMENTS

Figure 1:
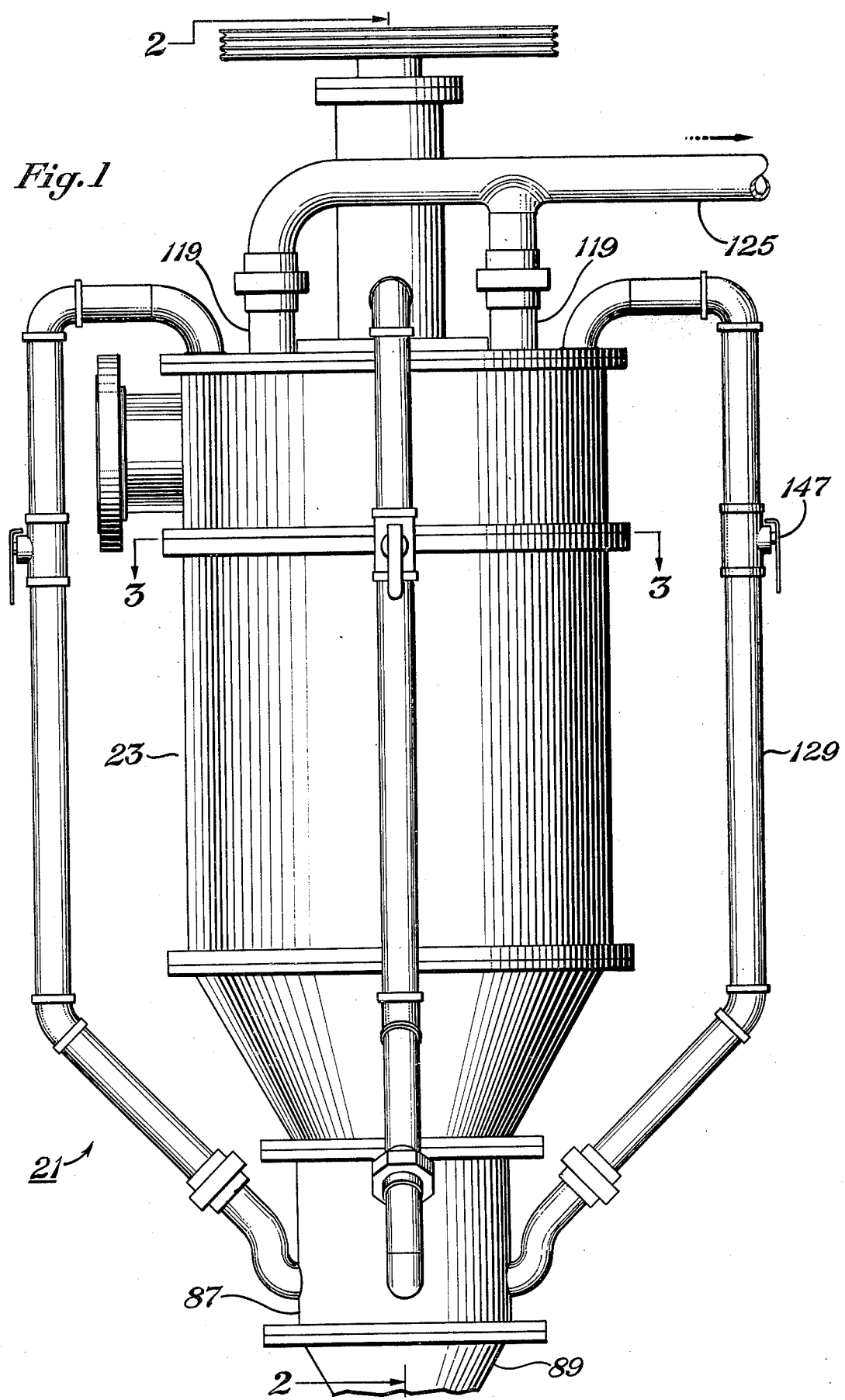
FIG. 1 is an exterior side view of the apparatus of the present invention.

Referring now to the drawings, reference numeral 21 identifies the apparatus of the present invention for separating gas from a fluid such as recirculated drilling mud. In the case of drilling mud, the gases separated may be methane, carbon dioxide, nitrogen, hydrogen sulfide, or any other gases in the formations which may contaminate the drilling fluid. As discussed above, it is desired to remove these gases in order to allow the drilling fluid to be reused and to make the drilling area safe for the operating personnel. It is also desired to remove oxygen from the drilling fluid in order to prevent or minimize corrosion of the drill string and casing. In normal operations, the drilling fluid becomes contaminated with air and hence oxygen when exposed to atmosphere.

Figure 2:
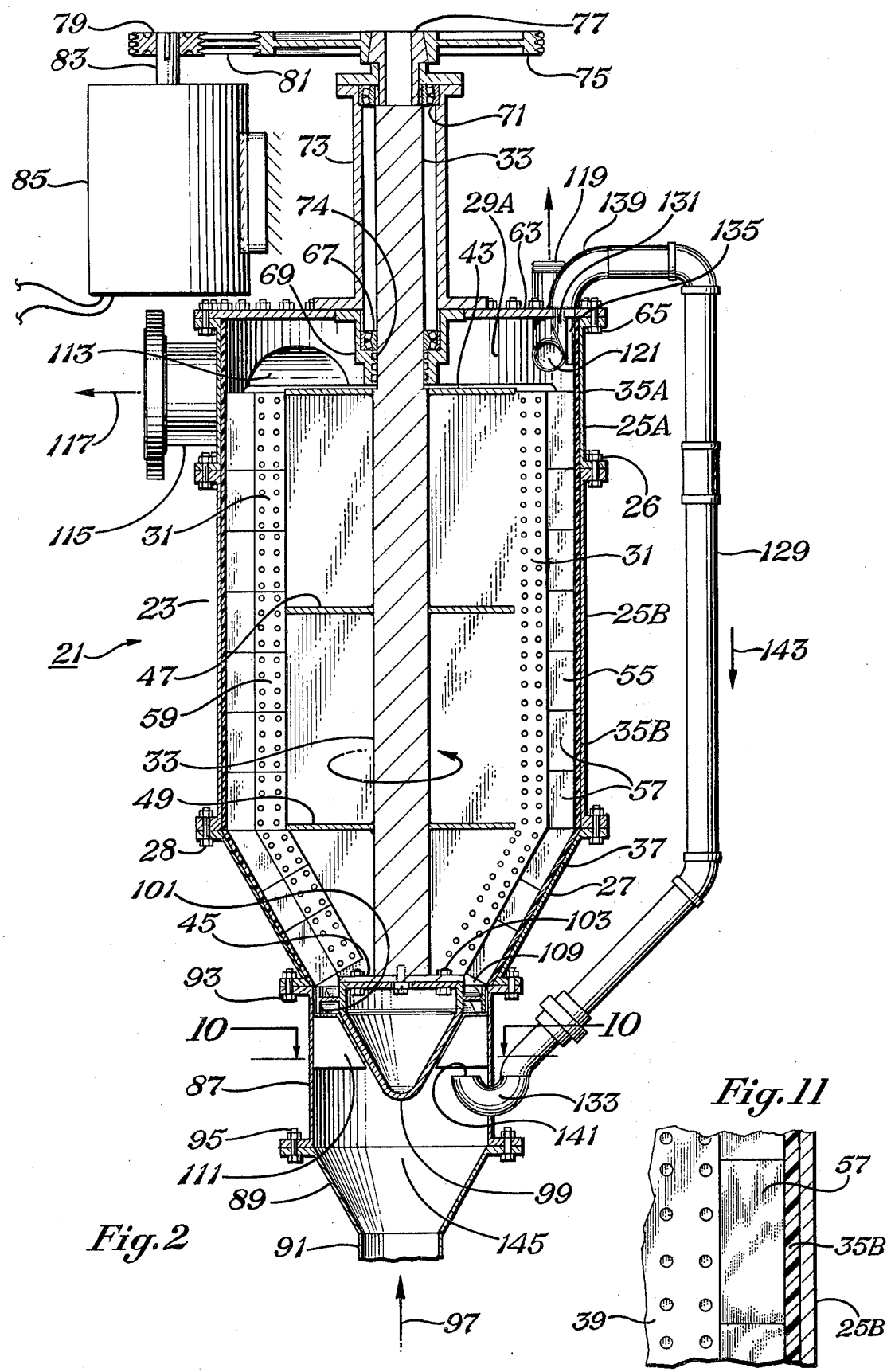
FIG. 2 is a cross sectional view of the apparatus of FIG. 1 as seen along lines 2—2 thereof.

As seen in FIGS. 2 and 3, the apparatus 21 comprises a housing 23 formed by cylindrical portions 25A and 25B and a conical shaped portion 27 defining a chamber 29 in which are located four blades 31 secured to a rotatable shaft 33. Shaft 33 has four grooves formed along its length at 90° intervals. As shown, housing portions 25A and 25B are secured together by bolts 26 and housing portions 25B and 27 are secured together by bolts 28. The inside walls of housing 25A, 25B, and 27 are lined with flexible liners 35A, 35B, and 37 respectively formed of an elastomer such as polyurethane. Each of the blades 31 comprises a metal plate 39 having its inner edge 41 located in one of the grooves formed in shaft 33. Each plate 39 also is secured to upper and lower discs 43 and 45 and intermediate discs 47 and 49 which space the plates 39 and hence the blades 31 at 90° intervals and provide structural support. As seen in FIG. 4, each of the plates 39 has slots 51 and 53 formed therein to receive the intermediate discs 47 and 49. As seen in FIG. 3, secured to the outer portion 39A of each plate 39 is a flexible blade 55 comprising a plurality of flexible blade members 57 (FIG. 2) formed of an elastomer such as polyurethane. The flexible blades 55 are secured to plates 39 by way of cap plates 59 and bolts 61 (FIG. 3). As seen in FIG. 2, the outer edges of the flexible blades 55 barely touch the inside of the liners 35A, 35B, and 37 when the shaft 33 is stationary.

The shaft 33 extends into the chamber 29 through an upper wall 63 which is secured to the top edge of the cylindrical housing portion 25A by way of bolts 65. It is supported for rotation by bearings 67 supported by structure 69 and by bearings 71 supported by structure 73 secured to the top wall 63. O-rings 74 prevent oil, grease, or air from leaking into the chamber 29. A pulley 75 is secured to the top of the shaft 33 by way of member 77 and is coupled to motor pulley 79 by way of a belt 81. Pulley 79 in turn is secured to shaft 83 of an electric motor 85. Operation of the motor 85 thus drives pulley 79, belt 81 and pulley 75 to rotate the shaft 33 and hence the blades 31.

Inlet structure comprising a cylindrical member 87, a conical shape member 89 and a conduit 91 forming a restricted inlet, is secured to the lower end of the conical shaped member 37 of the housing. As seen, cylinder 87 is secured to member 27 by way of bolts 93 and conical shaped member 89 is secured to cylinder 87 by way of bolts 95. The drilling mud from which gas is to be removed is fed through the restricted inlet 91 as depicted by arrow 97. Secured to the lower end of the shaft 33 is a cone member 99 having a blower 101 secured around its upper portion. Member 99 is secured to the disc 45 and hence to the lower end of the shaft by way of bolts 103. As seen in FIG. 9, blower 101 has spaced vanes 105 with passages 107 formed therebetween. Cone member 99 and blower 101 rotate with shaft 33 within the cylinder 87 and next to the opening 109 formed at the lower end of conical shaped portion 27 of the housing. Four flow straighteners 111 are secured to the inside of the cylinder 87 at 90° intervals. The flow straighteners are also shown in FIG. 10.

As seen in FIG. 2, at the upper end of the housing, an opening 113 is formed through the housing portion 25A and the liner 35A. A discharge conduit 115 is secured to the housing portion 25A around the opening 113. Flow from the discharge conduit 113 is in the direction of the arrow 117. The opening 113 and conduit 115 form an outlet for the degased drilling mud.

Four gas outlet conduits 119 extend into the upper portion 29A of the chamber 29 for removing gas separated from the drilling mud. Each gas outlet conduit 119 is L-shaped (see FIG. 8) having an opening 121 located in the chamber portion 29A at a position spaced radially outward from the shaft 33 near the upper cylindrical wall of the housing comprising housing wall 25A and liner 35A and spaced inwardly from the liner 35A. The opening 121 faces in a direction opposite the direction of flow of gas around the housing wall. In FIG. 8, the gas flow path is depicted by arrow 123. All of the gas outlet conduits 119 are the same and their openings 121 are all located at the same radial distance from the shaft 33 and face in a direction opposite the direction of gas flow around the cylindrical housing wall. Exhaust conduits 125 and 127 each are connected to the upper ends of two gas outlet conduits and extend to a suitable device for burning the gas, detoxifing the gas or otherwise disposing of the gas. Their outlets can be exposed to atmospheric pressure or connected to a vacuum pump.

As seen by FIG. 2, a feedback system is employed comprising one or more feedback conduits 129 each having its upper end 131 extending into the upper end 29A of the chamber 29 and its lower end 133 extending into cylinder 87 of the inlet structure. The upper end 131 of each feedback conduit has a rectangular opening 135 which is located against the liner 35A radially outward from the position of openings 121 of the gas outlets. The opening 135 is located such that it faces in a direction opposite the direction of the flow of processed drilling mud around the inside of the housing wall 35A, 25A. As seen also in FIG. 5, the end of the conduit 131 in which the opening 135 is formed flares outward from the opening 135 to an enlarged end 137 which is threaded to elbow 139 which forms part of feedback conduit 129. The lower end of the feedback conduit 129 has an opening 141 located inside of the cylinder 87. The direction of fluid flow through the feedback conduit 129 is shown by the arrow 143. All of the feedback conduits are the same and their openings 135 are all located at the same radial distance from the shaft 33 and face in a direction opposite the direction of flow of the drilling mud around the inside of the cylindrical housing wall.

In operation, the apparatus will be supported by suitable structure to allow the restricted inlet 91 to extend down into the drilling mud of the mud tank or to be coupled on line directly to a well for receiving the returned drilling mud from the well. In a mud tank, the apparatus inlet 91 will be submerged at least one foot below the surface of the drilling fluid. The apparatus can also be operated at a location near the mud system with suitable inlet and discharge manifolds. The motor 85 is operated to rotate the shaft 33 and the blades 31 at an angular velocity. For removing formation gases from the drilling mud, the rate of rotation may be 433 rpm. As the shaft rotates, a slightly less than atmospheric pressure will be created in the chamber 29 by the rotating blades and this lowered pressure along with the blower 101 moves the mud into the inlet 91 in the direction of arrow 97 and into the chamber 29. Pressure in zone 145 (a low pressure zone) is controlled by the area of the restricted inlet 91 which in turn may be controlled by a valve or orifice (not shown). Flow straighteners 111 prevent the inlet fluid from swirling and the rotating cone 99 helps guide the mud to the blower 101. In the chamber 29, the rotating blades cause the inducted mud to spin and the increasing radius of conical section 27, with the rotating blades will function as a centrifugal pump. As the blades rotate at a high velocity, a vortex is created in the chamber and the drilling mud spun or swirled by the blades against the inner liner 37, 35B, 35A, will move or climb upward as a thin layer against the inside surface of the inner liner up to the upper chamber portion 29A. Although the flexible blade portions 55 touch the inside of the inner liner when the shaft is stationary, when they are rotated in the mud, the drag of the mud will cause the flexible blade portions 55 to bend backward from the direction of rotation whereby they are out of contact with the inner liner. Formation of the mud as a thin layer against the inner liner of the wall of the chamber and creation of the low pressure in the chamber upon rotation of the blades allows the gas to readily separate from the mud. At the upper end 29A of the chamber, the degased mud is withdrawn through opening 113 and conduit 115 for reuse and the separated gas is withdrawn through the openings 121 and conduits 119, 125, and 127 for suitable disposal. Although the pressure in the chamber 29 may be below atmospheric pressure, the kinetic energy of the swirling mud will cause it to move outward through opening 113 and the kinetic energy of the swirling gas will cause it to move out through openings 121 and conduits 119. At increasing distances from the axis of rotation, the kinetic energy of the swirling mud and gas increases. Thus it is desirable to have the mud opening 113 and the gas openings 121 as far from the axis of rotation as possible with the gas openings 121 spaced inward from the mud opening 113 to prevent the degased mud from entering the gas opening 121. Interception by the opening 113 of the degased mud will convert the kinetic energy of the mud to static pressure. Similarly, interception by the openings 121 of the gas will convert the kinetic energy of the gas to static pressure. This static pressure will be slightly above atmospheric pressure. Although not shown, a down stream U-trap and discharge valve will be coupled to the mud discharge conduit 115 to insure that the conduit is liquid filled to prevent the flow of separated gas from the chamber 29 through the conduit 115 or the flow of gas from atmosphere into the chamber 29 through the conduit 115 and opening 113.

For a given set of conditions of mud flow rate and mud properties such as viscosity and density, the mud inlet 91 and the mud outlet 115 may be sized to obtain a fluid balance between the mud entering and leaving to maintain a thin layer of mud on the inner surface of the housing wall which does not discharge through the gas outlet openings 121. The conditions of the mud, however, vary and in order to maintain the proper thickness of the layer of mud on the inside surface of the housing wall under varying mud conditions, the feedback conduits 129 are provided. Their upper openings 135 are located radially outward from the gas openings 121 next to the liner 35A of the housing wall. As the mud is swirled against the liner at a high velocity, the upper feedback openings 135 intercept any mud inward of the liner and before it reaches the gas openings 121 for flow by way of conduits 129 and their lower openings 141 back to the low pressure zone 145 of the inlet structure. Even though the pressure in the upper chamber 29A is below atmospheric pressure and may be below the pressure in zone 145, the mud will flow into the openings 135, through the conduits 129 and out of outlet openings 141 due to the high velocity of the mud and as a result of the conversion of the kinetic energy of the mud to static pressure by the intereception of the rotating mud by the stationary openings 135. Thus the feedback conduits 129 control the thickness of the thin layer of mud to prevent it from discharging through gas openings 121. In one embodiment, the thickness of the thin layer of mud against the housing liner may be maintained at about one-fourth of an inch. Valves 147 are used to adjust the flow through the conduits 129 to the minimum required to maintain the desired thickness of the layer of mud on the inner liner of the housing wall so as to maximize the total flow through inlet 91.

The flexible blade portions 55 and the liner 35A, 35B, and 37 are formed of an elastomer which is wear resistent to abrasion. Thus these components have high wear characteristics. The flexible blade portions 55 allows the apparatus to pass large particles of solid through the machine with no detrimental effect. In one embodiment, the distance from the outer edges 39B of the plates 39 to the inside surface of the liner 35A, 35B, 37 may be two inches. Thus the width of the flexible blade portions 55 from the outer edges 39B of plates 39 to the liner is about two inches. Although the outer edges of the blade portions 55 may barely touch the inside surface of the liner when the shaft is stationary, it is to be understood that they may have a width such that their outer edges are spaced inwardly from the liner a small distance such as about 1/32 of an inch. Since the flexible blade portions extend to or near the inside surface of their liner, better swirling action is achieved and they also prevent cake build up. If the apparatus is employed directly on line the blades 31 may be constructed such that the distance from plate edges 39B to the liner is greater than two inches whereby larger solids may be passed. The width of the flexible blade portions 55 beyond the edges 39B will be correspondingly greater. In mounting the apparatus, it will be mounted preferably on soft mounts to minimize any out of balance condition caused by the large particles entering the chamber. Although the shaft has been described as being driven by an electric motor and belts, it is to be understood that roller chains, gears, or direct drive systems may be employed to rotate the shaft 33. In addition other power sources instead of an electric motor may be employed. If the apparatus is employed to remove oxygen from drilling mud, it preferably will be rotated at a speed greater than 433 rpm. A vacuum pump may be connected to conduits 125 and 127 to decrease the pressure in chamber 29. Although the apparatus is preferably mounted such that the shaft 33 is vertical, it is to be understood that it may be mounted such that the shaft 33 is horizontal.

For processing certain types of fluids, the blower 101 may not be needed and hence may be removed. If the fluid being processed is not frothy, for example, the blower will not be needed. In addition the blower will not be needed in processing drilling fluids containing certain types of loss circulation material. If the blower is not employed and a vacuum pump is concentrated to conduits 125 and 127, the centrifugal pumping action of the rotating blades will act to induce and cause the drilling fluid to flow into the chamber and upward and to be spun against the inner liner and to move upward as a thin layer as described previously. Thus the apparatus is self priming without the blower 101. If a blower is not employed, the flow straighteners 111 will not be needed, however, the cone 99 may still be used to act as a guide for guiding the fluid into the chamber.

In one embodiment, the outside diameter of the cylindrical walls of the apparatus may be about two feet and the length of the shaft 33 may be slightly over five feet. Thus the entire length of the apparatus may be about six or seven feet. A seven and one-half or ten horsepower electric motor will process about six hundred to eight hundred gallons of water per minute. If the horsepower is increased, the flow rate of fluid capable of being processed also will be increased.

Although the apparatus of the present invention was described as being used to remove gas from drilling fluids in the oil industry, it is to be understood that it could be used for degassing fluids and slurry in other industries.

I claim:

1. Apparatus for removing gas from a fluid, comprising:

a housing comprising wall structure defining a chamber having a central axis extending between first and second ends of said housing, inlet means in fluid communication with said chamber, located at said first end of said housing for receiving fluid to be processed, a plurality of blade means located in said chamber for rotation about said central axis, said blade means being angularly spaced around said axis, means for rotating said blade means for spinning the fluid received through said inlet means, against the inside surface of the wall of said housing as a thin layer and moving said fluid as a thin layer to the end of said chamber opposite said inlet means for allowing the gas in said fluid to separate from said fluid, gas outlet means at said end of said chamber opposite said inlet means and spaced radially outward from said axis for withdrawing the gas separated from said fluid and, fluid outlet means at said end of said chamber opposite said inlet means, said fluid outlet means being spaced radially outward from said axis and radially outward from said gas outlet means for withdrawing the fluid from which the gas has separated.

2. The apparatus of claim 1 wherein:

the inside of said housing in cross section through said axis is round, the ends of said blade means extend to positions near the inside wall of said housing.

3. The apparatus of claim 2 wherein:

the inside of said housing is conical shaped from said first end to a plane perpendicular to said axis between said first end and said second end, and the inside of said housing is cylindrical in shape from said plane to said second end.

4. The apparatus of claim 3, wherein:

the outer ends of said blade means are flexible.

5. The apparatus of claim 4, wherein:

the inside wall of said housing between said first and second ends comprises a resilient liner.

6. The apparatus of claim 2, wherein:

the outer ends of said blade means are flexible.

7. The apparatus of claim 6, wherein:

the inside wall of said housing between said first and second ends comprises a flexible liner.

8. The apparatus of claim 2, comprising:

shaft means extending into said chamber along said axis, said chamber has a given length between said first and second ends of said housing, each of said blade means comprising a vane connected to said shaft means along its length and flexible means connected to the outer portion of the vane, each of said vanes having a length nearly equal to said length of said chamber, said means for rotating said blade means comprising drive means coupled to said shaft means for rotating said shaft means and hence said blade means.

9. The apparatus of claim 1, wherein:

said first end of said housing is the lower end thereof and said second end is the upper end.

10. The apparatus of claim 1 wherein:

the outer ends of said blade means are flexible.

11. The apparatus of claim 10 wherein:

the inside wall of said housing between said first and second ends comprises a resilient liner.

12. The apparatus of claims 1, 2, 3, 9, 10, 11, 6, 7, 4 or 5 comprising:

shaft means extending into said chamber along said axis, said chamber has a given length between said first and second ends of said housing, each of said blade means is connected to said shaft means along its length and has and end means which extends to a position near the inside wall of said housing along nearly the entire length of said chamber, the end means of said blade means being angularly spaced from each other around said axis, said means for rotating said blade means comprising drive means coupled to said shaft means for rotating said shaft means and hence said blade means.

13. The apparatus of claims 1, 2, 3, 9, 10, 11, 6, 7, 4 or 5 comprising:

shaft means extending into said housing along said axis, said chamber has a given length between said first and second ends of said housing, each of said blade means is connected to said shaft means along its length and has and end means which extends to a position near the inside wall of said housing along nearly the entire length of said chamber, the end means of said blade means being angularly spaced from each other around said axis, said means for rotating said blade means comprising drive means coupled to said shaft means for rotating said shaft means and hence said blade means, said blade means being solid members impervious to the flow of liquid.

14. The apparatus of claim 1, 2, 3, 9, 10, 11, 6, 7, 8, 4, or 5 comprising:

conduit means having one end at said end of said chamber opposite said inlet means and an opposite end in fluid communication with said inlet means for flowing fluid from said end of said chamber opposite said inlet means, to said inlet means for controlling the thickness of the layer of fluid on the inside surface of the wall of said housing and for preventing fluid from flowing through said gas outlet means.

15. The apparatus of claims 1, 2, 3, 9, 10, 11, 6, 7, 8, 4, or 5, comprising:

conduit means having one end at said end of said chamber opposite said inlet means and an opposite end in fluid communication with said inlet means for flowing fluid from said end of said chamber opposite said inlet means, to said inlet means for controlling the thickness of the layer of fluid on the inside surface of the wall of said housing and for preventing fluid from flowing through said gas outlet means, said one end of said conduit means having an opening located in said end of said chamber opposite said inlet means at a position radially outward of said gas outlet means and radially inward of said fluid outlet means.

16. The apparatus of claims 1, 2, 3, 9, 10, 11, 6, 7, 4, or 5, comprising:

conduit means having one end at said end of said chamber opposite said inlet means and an opposite end in fluid communication with said inlet means for flowing fluid from said end of said chamber opposite said inlet means, to said inlet means for controlling the thickness of the layer of fluid on the inside surface of the wall of said housing and for preventing fluid from flowing through said gas outlet means, shaft means extending into said housing along said axis, each of said blade means being connected to said shaft means along its length, said means for rotating said blade means comprising drive means coupled to said shaft means for rotating said shaft means and hence said blade means.

17. The apparatus of claim 1, comprising:

shaft means extending from the outside into said chamber along said axis, said shaft means extending into said chamber from said second end of said housing, said chamber has a given length between said first and second ends of said housing, each of said blade means is connected to said shaft means along its length, each of said blade means has an end means which is generally parallel to said axis and which extends to a position near the inside wall of said housing along nearly the entirely length of said chamber, the end means of said blade means being angularly spaced from each other around said axis, said means for rotating said blade means comprising drive means located outside of said chamber and coupled to said shaft means outside of said chamber for rotating said shaft means and hence said blade means.

18. The apparatus of claim 17, comprising:
blower means located at said first end of said housing to facilitate movement of fluid into said chamber.

19. The apparatus of claim 1, comprising:
shaft means extending into said chamber along said axis,
each of said blade means is coupled to said shaft means and extends nearly the entire distance between said first and second ends of said housing,
the outer ends of each of said blade means extend to a position near the inside wall of said housing,
each of said blade means comprising thin means with the thin plane thereof being generally parallel to said axis.

20. The apparatus of claim 19, wherein:
the fluid received through said inlet means is spun by said blade means against the inside surface of the side wall of said housing between said first and second ends of said housing,
said gas outlet means is located at a radial position from said axis near said side wall of said housing.

21. The apparatus of claim 1, wherein:
The fluid received through said inlet means is spun by said blade means against the inside surface of the side wall of said housing between said first and second ends of said housing,
said gas outlet means is located at a radial position from said axis near said side wall of said housing.

22. The apparatus of claims 19, 21, or 20, wherein:
the inside wall of said housing between said first and second ends comprises a resilient liner.

23. The apparatus of claims 19, 21, or 20, wherein:
the outer ends of said blade means are flexible.

24. The apparatus of claims 19, 21, or 20, wherein:
the inside wall of said housing between said first and second ends comprises a resilient liner,
the outer ends of said blade means are flexible and extend to positions near the inside surface of said resilient liner.

25. Apparatus for removing gas from a fluid comprising:
a housing comprising wall structure defining a chamber having a central axis extending between first and second ends of said housing,
inlet means located at said first end of said housing for receiving fluid to be processed,
a plurality of blade means located in said chamber for rotation about the central axis of said housing,
said blade means being angularly spaced around said axis,
means for rotating said blade means for spinning the fluid received through said inlet means against the inside surface of the wall of said housing as a thin layer and moving said fluid as a thin layer to the end of said chamber opposite said inlet means for allowing the gas in said fluid to separate from said fluid,
gas outlet means at said end of said chamber opposite said inlet means for withdrawing the gas separated from said fluid,
fluid outlet means at said end of said chamber opposite said inlet means for withdrawing fluid from which the gas has separated, and
conduit means having one end at said end of said chamber opposite said inlet means and an opposite end in fluid communication with said inlet means for flowing fluid from said end of said chamber opposite said inlet means, to said inlet means for controlling the thickness of the layer of fluid on the inside surface of the wall of said housing and for preventing said fluid from flowing through said gas outlet means.

26. Apparatus for removing gas from a fluid, comprising:
a housing comprising wall structure defining a chamber having a central axis extending between first and second ends of said housing,
said first end being the bottom end of said housing and said second end being the top end of said housing,
inlet means in fluid communication with said chamber, located at said first end of said housing for receiving fluid to be processed,
a plurality of blade means located in said chamber for rotation about said central axis,
said blade means being angularly spaced from each other around said axis,
means for rotating said blade means for spinning the fluid received through said inlet means, against the inside surface of the wall of said housing as a thin layer and moving said fluid upward as a thin layer to the end of said chamber opposite said inlet means for allowing the gas in said fluid to separate from said fluid,
gas outlet means at said end of said chamber opposite said inlet means and spaced radially outward from said axis for withdrawing the gas separated from said fluid, and
fluid outlet means at said end of said chamber opposite said inlet means,
said fluid outlet means being spaced radially outward from said axis and radially outward from said gas outlet means for withdrawing the fluid from which the gas has separated.

27. The apparatus of claim 26, comprising:
shaft means extending into said chamber along said axis,
each of said blade means is coupled to said shaft means and extends nearly the entire distance between said first and second ends of said housing,
the outer ends of each of said blade means extend to a position near the inside wall of said housing,
each of said blade means comprising thin means with the thin plane thereof being generally parallel to said axis.

28. The apparatus of claim 27, wherein:
the fluid received through said inlet means is spun by said blade means against the inside surface of the side wall of said housing between said first and second ends of said housing,
said gas outlet means is located at a radial position from said axis near said side wall of said housing.

29. The apparatus of claim 26, wherein:
the fluid received through said inlet means is spun by said blade means against the inside surface of the side wall of said housing between said first and second ends of said housing,
said gas outlet means is located at a radial position from said axis near said side wall of said housing.

30. The apparatus of claims 27, 29, or 28, wherein:
the inside wall of said housing between said first and second ends comprises a resilient liner.

31. The apparatus of claims 27, 29, or 28, wherein:
the outer ends of said blade means are flexible.

32. The apparatus of claims 27, 29, or 28, wherein:

the inside wall of said housing between sad first and second ends comprises a resilient liner,
the outer ends of said blade means are flexible and extend to positions near the inside surface of said resilient liner.

33. The apparatus of claim 26, wherein:
the fluid to be received through said inlet means comprises a liquid fluid.

34. The apparatus of claim 26, comprising:
conduit means having one end at said end of said chamber opposite said inlet means and an opposite end in fluid communication with said inlet means for flowing fluid from said end of said chamber opposite said inlet means, to said inlet means for controlling the thickness of the layer of fluid on the inside surface of the wall of said housing and for preventing fluid from flowing through said gas outlet means.

* * * * *